Figure 1:
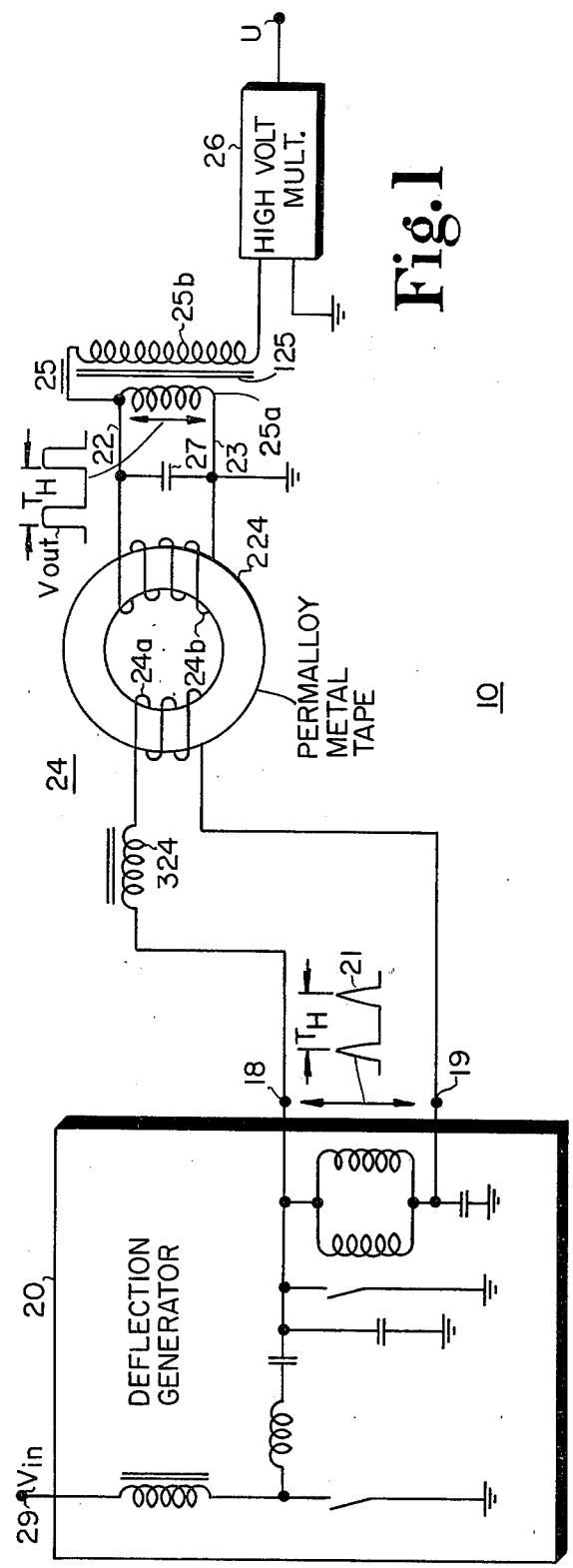

United States Patent [19]

Gries et al.

[11] 4,345,188

[45] Aug. 17, 1982

[54] TELEVISION RECEIVER HIGH FREQUENCY REGULATED POWER SUPPLY INCLUDING A LOW VOLTAGE FERRORESONANT TRANSFORMER COUPLED TO A STEP-UP HIGH VOLTAGE TRANSFORMER

[75] Inventors: Robert J. Gries, Indianapolis, Ind.; Sandor Miko, Torreon, Mexico; Calvin E. Conn, Carmel, Ind.

[73] Assignee: RCA Corporation, New York, N.Y.

[21] Appl. No.: 250,129

[22] Filed: Apr. 2, 1981

[51] Int. Cl.³ .............................................. H01J 29/70
[52] U.S. Cl. .................................... 315/411; 315/400; 323/310
[58] Field of Search ................ 315/411, 400; 358/190; 323/306, 307, 310

[56] References Cited

U.S. PATENT DOCUMENTS

| | | | |
|---|---|---|---|
| 3,739,255 | 6/1973 | Leppert | 321/16 |
| 3,798,497 | 3/1974 | Manske | 315/29 |
| 3,868,538 | 2/1975 | Blanchard | 315/411 |
| 4,240,013 | 12/1980 | Wedam | 315/411 |

FOREIGN PATENT DOCUMENTS 3003321 7/1980 Fed. Rep. of Germany .
2041668 9/1980 United Kingdom .

OTHER PUBLICATIONS

Paper presented at 1977 Convention of Institute of Television Engineers of Japan entitled "Stabilized Power Supply Incorporating High-Frequency Ferro-Resonance Transformer", T. Kadota et al., dated 10-7-77.

*Primary Examiner*—Theodore M. Blum
*Attorney, Agent, or Firm*—E. M. Whitacre; P. J. Rasmussen; J. Laks

[57] ABSTRACT

A source of high frequency alternating input voltage is coupled to the primary winding of a high frequency low voltage ferroresonant transformer of a television receiver power supply. A capacitor is coupled across the secondary output winding of the ferroresonant transformer, and generates a circulating current that magnetically saturates the secondary core portion of the transformer to regulate the alternating polarity output voltage developed across the secondary output winding. A step-up high voltage transformer includes a primary winding and a high voltage secondary winding tightly coupled to the step-up transformer primary winding. The regulated alternating polarity output voltage developed by the low voltage ferroresonant transformer is coupled to the primary winding of the step-up high voltage transformer without prior DC rectification of the ferroresonant transformer output voltage. The applied, regulated ferroresonant transformer output voltage develops a regulated high voltage across the step-up transformer high voltage secondary winding. A high voltage rectifier arrangement develops an ultor voltage from the regulated high voltage.

10 Claims, 2 Drawing Figures

TELEVISION RECEIVER HIGH FREQUENCY REGULATED POWER SUPPLY INCLUDING A LOW VOLTAGE FERRORESONANT TRANSFORMER COUPLED TO A STEP-UP HIGH VOLTAGE TRANSFORMER

This invention relates to high frequency ferroresonant power supplies for television receivers.

A ferroresonant transformer power supply provides inherent output voltage regulation without the need for relatively complex and expensive electronic regulator control circuitry. When operated at a relatively high input frequency, a ferroresonant transformer is a relatively compact and low weight unit, well suited as a television receiver power supply. It is known to use a low voltage ferroresonant transformer to provide a regulated DC B+ scan supply voltage to a horizontal deflection circuit of a television receiver and also to provide other regulated DC low voltages to other television receiver circuits, such as the audio, signal and vertical deflection circuits.

When using such a low voltage ferroresonant power supply in a television receiver, a second high voltage power supply must be included to develop the ultor voltage required by the television receiver picture tube anode. The high voltage power supply may include a flyback transformer which steps up the retrace pulse voltage developed by the horizontal deflection circuit and then rectifies the high voltage output from the flyback transformer to develop the ultor voltage.

Many television receivers incorporate high voltage protection circuits which disable or shut down high voltage power supply operation if excessive ultor voltage is generated due to a failure in the circuitry of the high voltage power supply. In general, a ferroresonant transformer power supply provides inherent protection against the generation of excessive output voltage. For example, if the input voltage to the ferroresonant transformer exceeds the design limits, the transformer will come out of ferroresonant mode of operation, producing a substantial decrease in the output voltage, rather than producing an undesirable increase in voltage. Similarly, component failures in the ferroresonant transformer circuit, such as a shorted or disconnected resonating capacitor, results in the ferroresonant transformer coming out of the ferroresonant mode of operation and producing a decrease in the output voltage.

In the aforedescribed ferroresonant power supplies for television receivers wherein the ferroresonant transformer is used to provide a regulated rectified DC B+ voltage, and wherein a flyback transformer generates the high voltage, inherent failsafe operation of the high voltage power supply is absent. For example, if the retrace capacitor in the horizontal deflection circuit becomes open-circuited, the amplitude of the retrace pulse voltage may increase to the point where excessive high voltage can be generated. A high voltage protection circuit must therefore also be provided. The advantageous feature that a ferroresonant transformer has, that of providing failsafe mode of operation, is not taken advantage of by the above-described high voltage power supply.

Other television receiver high voltage power supplies are known wherein the ultor voltage is regulated by providing a flyback transformer which itself is operated in the ferroresonant mode. Flyback pulses are coupled to the flyback transformer primary winding and a resonating capacitor is coupled across another flyback transformer winding to regulate the voltage developed across the high voltage winding by means of ferroresonant action. Such an arrangement has the relative disadvantage of requiring a single transformer to satisfy two sets of design constraints, with some of the design constraints in each set being incompatible with one another. Thus, in a ferroresonant flyback high voltage transformer, the flyback transformer must not only satisfy the design constraints needed to obtain ferroresonant action, but must also satisfy the design constraints of the generation of a relatively high output voltage. Difficulties arise when attempting to satisfy both sets of design constraints. Such difficulties include the difficulty of pulling down thick insulation with small wire on a core made relatively fragile due to an unusual core geometry that may be required. Such difficulties also include the difficulty of providing adequate core cooling in a situation where the conductor wires of the high voltage winding tend to prevent access to the core for heat sinking purposes.

Other known ferroresonant transformers use a high frequency square-wave voltage developed by an inverter as the exciting source for the primary winding of a ferroresonant transformer. Such an inverter-driven high frequency ferroresonant transformer may, after rectification, provide a regulated DC low voltage. A second inverter may then have to be used to generate an AC voltage for a high voltage transformer, thereby incurring extra costs and complexity in the inverter. The failsafe nature of a ferroresonant high voltage power supply is also defeated in this type of arrangement in that failures in the second inverter circuit may cause the high voltage to increase excessively, thereby requiring a separate safety circuit to be incorporated into the power supply circuitry.

A feature of the invention is the design of a high voltage ferroresonant power supply of efficient, compact design using two magnetic elements in the power supply. The first element is operated in a ferroresonant mode to provide a regulated output voltage and the second magnetic element, responsive to the output of the first element, generates the high voltage. The second element may then be designed free of constraints imposed by the need for ferroresonant operation. Another feature of the invention is the design of a regulated high voltage power supply that retains inherent failsafe high voltage operation that may be attainable in a ferroresonant system.

In accordance with the invention, a ferroresonant saturable reactor is excited by an alternating input voltage to develop an alternating polarity output voltage across the reactor winding. The ferroresonant saturable reactor is coupled to a resonating capacitance that generates a circulating current during each half cycle of the alternating polarity output voltage for magnetically saturating at least a portion of the reactor core to regulate the alternating polarity output voltage by means of ferroresonant action. A step-up high voltage transformer includes a primary winding and a high voltage secondary winding. The regulated alternating polarity output that is developed by the ferroresonant saturable reactor is coupled to the step-up transformer primary winding without prior rectification of the regulated output voltage. A regulated high voltage is thereby developed across the step-up transformer high voltage secondary winding. A high voltage rectifier arrangement coupled to the high voltage secondary winding FIG. 1 illustrates a ferroresonant ultor voltage power supply embodying the invention; and FIG. 2 illustrates another ferroresonant ultor voltage power supply embodying the invention.

Figure 2:
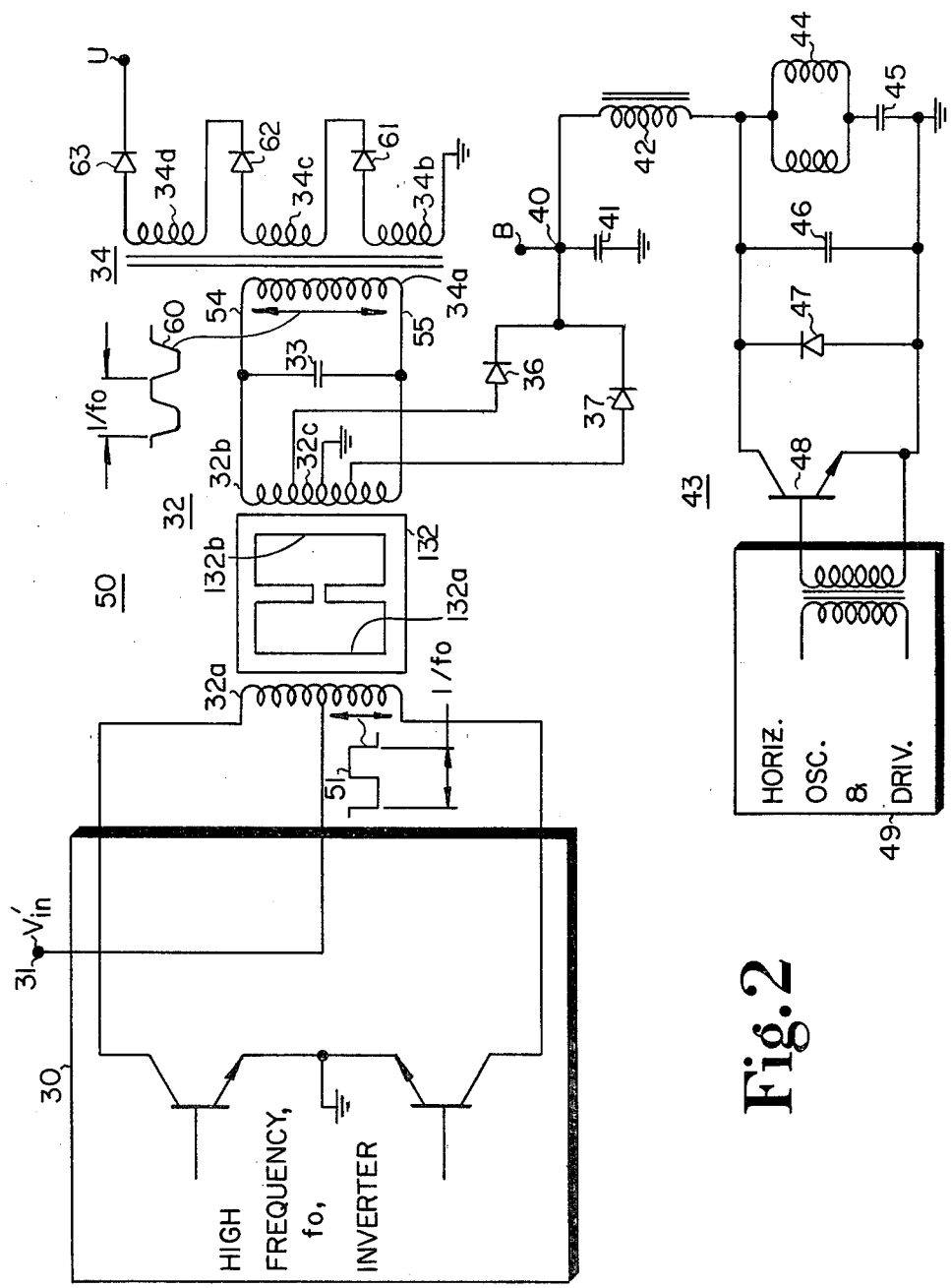

In a high frequency television display ultor voltage power supply 10, illustrated in FIG. 1, a DC input voltage Vin, such as may be obtained from a rectified mains supply voltage, is applied to a power inverter 20 at a terminal 29 to develop an alternating input voltage 21 for a ferroresonant saturable reactor arrangement 24. Power inverter 20 may comprise, for example, a horizontal deflection generator of the thyristor deflection type to develop a retrace pulse voltage, at the horizontal deflection frequency, $1/T_H$, as the alternating input voltage 21.

Retrace pulse voltage 21 developed across output terminals 18 and 19 of deflection generator 20 is coupled by way of an input choke 324 to the primary winding 24a of a ferroresonant transformer 24. Ferroresonant transformer 24 comprises primary winding 24a located on a magnetizable core 224, a secondary winding 24b also located on core 224, and a resonating capacitor 27 coupled across secondary winding 24b.

Ferroresonant saturable reactor transformer 24 is excited by the retrace pulse voltage 21 into developing an alternating polarity output voltage Vout across the reactor transformer secondary winding 24b. To regulate the saturable reactor transformer output voltage Vout in a ferroresonant manner, capacitor 27 generates a circulating current during each half cycle of the alternating polarity output voltage that aids in magnetically saturating magnetizable core 224.

The core 224 of ferroresonant transformer 24 may comprise a permalloy metal tape wound core formed of thin strips of laminated magnetizable metal tape wound into a toroidal configuration. The thin laminated tape wound core exhibits a relatively square B-H hysteresis loop characteristic, low coercivity, and high resistance to eddy current, providing good output voltage regulation, low losses and temperature stability of the output voltage Vout. Although windings 24a and 24b are illustrated schematically in FIG. 1 as being wound on opposite portions of core 224, to achieve tight magnetic coupling between the two windings, the two windings are concentrically wound over the entire circumference of the core.

Secondary winding 24b of ferroresonant transformer 24 is directly coupled across the primary winding 25a of a step-up high voltage transformer 25 by means of conductors 22 and 23. The regulated alternating polarity output voltage Vout is therefore applied directly across step-up transformer primary winding 25a without prior rectification of the regulated output voltage.

The regulated output voltage Vout is stepped up by transformer 25 to develop a regulated high voltage across a high voltage secondary winding 25b. A high voltage rectifier arrangement comprising a voltage multiplier 26 is coupled to the high voltage secondary winding and to an ultor terminal U of a television receiver picture tube, not illustrated, to develop an ultor voltage from the regulated high voltage.

Because ferroresonant transformer 24 provides only a low alternating polarity voltage across its secondary output winding 24b, the ferroresonant transformer may be constructed as a relatively small efficient unit such as the tape wound core transformer illustrated in FIG. 1. Similarly, because the step-up high voltage transformer 25 does not have to be constructed in the form of a ferroresonant transformer to develop a regulated high voltage, high voltage transformer 25 may be constructed as a compact, magnetically tightly coupled unit such as the autotransformer arrangement illustrated schematically in FIG. 1.

With regulated alternating polarity output voltage Vout being directly applied across high voltage transformer primary winding 25a without prior rectification of the regulated output voltage, an additional inverter stage between ferroresonant transformer 24 and high voltage transformer 25 is eliminated. Had the inverter stage been required, failure in the inverter stage circuitry could have caused an excessive increase in high voltage.

FIG. 2 illustrates a television receiver ferroresonant low and high voltage power supply 50. The ferroresonant transformer 32 of power supply 50 in addition to providing a regulated alternating polarity output voltage 60 to a step-up high voltage transformer 34, also provides a regulated low voltage for developing a regulated DC B+ scan supply voltage.

In FIG. 2, an unregulated DC input voltage, $V_{in}'$ developed at a terminal 31, energizes a high frequency, $f_0$, inverter 30. High frequency inverter 30 develops an unregulated alternating polarity square-wave voltage 51 repeating at the frequency $f_0$ across each section of a center tapped primary winding 32a of ferroresonant transformer 32.

Ferroresonant transformer 32 comprises a primary winding 32a, a magnetizable core 132, and center tapped secondary output windings 32b and 32c. Core 132 comprises a three-legged core with the primary winding 32a wound around one outer leg 132a of the core, and the secondary output wound windings wound around the other outer leg 132b. An air-gapped center leg provides a shunt path for flux flowing in each of the outer legs to produce loose coupling between the primary winding and the secondary output windings of a ferroresonant transformer. The use of an input choke in series with the input voltage source is not required provided loose coupling exists between the primary winding and the secondary output winding. Other suitable geometries for ferroresonant transformer core 132 may be used. For example, core 132 may be a rectangular core without a center leg. Both primary winding 32a and secondary winding 32b may be wound around the same core leg. To provide the loose coupling, the two windings are spaced apart from each other on the same leg. A suitable core material and construction for a high frequency ferroresonant transformer may be a lithium ferrite core constructed as taught in copending U.S. patent application of R. Shahbender et al., Ser. No. RCA 76,945, entitled "TELEVISION RECEIVER FERRORESONANT HIGH VOLTAGE POWER SUPPLY USING TEMPERATURE STABLE CORE MATERIAL," herein incorporated by reference.

To regulate output voltage 60 by ferroresonant action, a resonating capacitor 33 is coupled across ferroresonant transformer secondary winding 32b. Capacitor 33 generates a circulating current during each half-cycle of the alternating polarity output voltage 60 that aids in magnetically saturating core leg 132b. As core leg 132b goes into saturation and comes out of saturation, the inductance exhibited by secondary winding 32b switches between a low impedance state and a high impedance state. Under control of this switching action, the amplitude of the output voltage 60 is regulated against changes in the amplitude of the input voltage 51 and against changes in loading on ferroresonant transformer secondary windings 32b and 32c.

The primary winding of step-up high voltage transformer 34 is directly coupled across ferroresonant transformer secondary output winding 32b by means of conductors 54 and 55. The regulated alternating polarity output voltage 60 is therefore applied across the high voltage transformer primary winding 34a without prior rectification of the ferroresonant transformer output voltage. High voltage transformer 34 steps up the regulated voltage 60 to produce regulated high voltages across each of the three high voltage winding sections 34b-34d. The regulated high voltage developed across each of windings 34b-34d is rectified by a respective one of diodes 61-63 to produce a DC ultor voltage at a terminal U.

The regulated alternating polarity output voltage developed across ferroresonant transformer secondary output winding 32c is full-wave rectified by diodes 36 and 37 and filtered by a capacitor 41 to develop a regulated DC B+ scan supply voltage at a terminal 40. The regulated B+ voltage is applied through an input choke 42 to energize a horizontal deflection generator 43 into developing scanning current in a horizontal deflection winding 44. Horizontal deflection generator 43 comprises the series arrangement of horizontal deflection winding 44 and an S-shaping or trace capacitor 45, a retrace capacitor 46, a damper diode 47, a horizontal output transistor 48 and a horizontal oscillator and driver circuit 49.

Because the alternating polarity voltage applied to the primary winding of high voltage transformer 34 is already regulated by the low voltage ferroresonant transformer 32, high voltage transformer 34 does not have to be designed as a ferroresonant high voltage transformer. The magnetizable core of the step-up transformer is operated in the substantially unsaturated region of the B-H loop characteristic of the transformer core material, and the transformer high voltage portion may be constructed as an integrated transformer with diodes 61-63 molded integrally within the transformer structure. The regulated alternating polarity voltage 60 applied across the high voltage primary winding 34a cannot increase excessively because of the failsafe nature of the ferroresonant transformer action. Because of the tight coupling between high voltage transformer primary windings 34b-34d, the alternating polarity high voltages also cannot increase excessively and are also regulated in a failsafe manner.

The ferroresonant transformer 32 is designed to provide only low voltage outputs and is not designed to provide a high voltage output. The construction of ferroresonant transformer 32 may be made such as to provide better input voltage and load regulation than a ferroresonant transformer that provides both a regulated low voltage alternating polarity voltage and a regulated high voltage alternating polarity voltage.

To further reduce the size of each of the magnetic elements 32 and 34, the high frequency inverter may be operated at frequencies $f_0$ substantially greater than the horizontal deflection frequency to provide the required magnitude low and high voltages for a television receiver. A failure in the inverter circuitry, such as a failure which produces a higher than designed inverter frequency of operation, nevertheless, does not result in an excessively large output voltage 60 being generated before the output voltage collapses due to the ferroresonant transformer 32 coming out of ferroresonant mode of operation.

We claim:

1. A ferroresonant television display ultor voltage power supply, comprising:
    a source of alternating input voltage;
    a capacitance;
    a saturable reactor forming a ferroresonant arrangement with said capacitance, said saturable reactor including a magnetizable core and a reactor winding;
    means coupled to said source for exciting said saturable reactor into developing an alternating polarity output voltage across said reactor winding, said capacitance generating a circulating current during each half cycle of said alternating polarity output voltage that magnetically saturates at least a portion of said magnetizable core to regulate said alternating polarity output voltage by means of ferroresonant action;
    a step-up high voltage transformer including a primary winding and a high voltage secondary winding;
    means for coupling said step-up transformer primary winding to the regulated alternating polarity output voltage that is developed by said ferroresonant arrangement without prior rectification of said regulated output voltage for developing a regulated high voltage across said high voltage secondary winding;
    an ultor terminal; and
    a high voltage rectifier arrangement coupled to said high voltage secondary winding and to said ultor terminal for developing an ultor voltage at said ultor terminal.

2. A power supply according to claim 1 wherein the saturable reactor magnetizable core comprises thin strips of laminated magnetizable metal tape wound into a toroidal configuration.

3. A power supply according to claim 1 wherein the primary and high voltage secondary windings of said step-up transformer are magnetically tightly coupled to each other.

4. A power supply according to claim 3 wherein said primary and high voltage secondary windings form an autotransformer arrangement.

5. A power supply according to claims 1, 2, 3 or 4 wherein said primary and high voltage secondary windings are located on a magnetizable core of the step-up transformer that is operated in the substantially unsaturated region of the B-H loop characteristic of the step-up transformer magnetizable core material.

6. A power supply according to claims 1, 2, 3 or 4 wherein said source of alternating input voltage comprises a horizontal deflection generator that produces a horizontal retrace pulse voltage at a deflection generator output terminal and including means for coupling said retrace pulse voltage to said saturable reactor for developing said alternating polarity output voltage therefrom.

7. A television display including a ferroresonant power supply, comprising:
    a source of alternating input voltage;
    a deflection winding;

a deflection generator coupled to said deflection winding and being energized by a B+ voltage for generating scanning current in said deflection winding;

a capacitance;

a saturable reactor forming a ferroresonant arrangement with said capacitance, said saturable reactor including a magnetizable core and a reactor winding;

means coupled to said source for exciting said saturable reactor into developing an alternating polarity output voltage across said reactor winding, said capacitance generating a circulating current during each half cycle of said alternating polarity output voltage that magnetically saturates at least a portion of said magnetizable core to regulate said alternating polarity output voltage by means of ferroresonant action;

a step-up high voltage transformer including a primary winding and a high voltage secondary winding;

means for coupling said step-up transformer primary winding to the regulated alternating polarity output voltage that is developed by said ferroresonant arrangement without prior rectification of said regulated output voltage for developing a regulated high voltage across said high voltage secondary winding;

an ultor terminal;

a high voltage rectifier arrangement coupled to said high voltage secondary winding and to said ultor terminal for developing an ultor voltage at said ultor terminal; and means responsive to said regulated alternating polarity output voltage that is developed by said ferroresonant arrangement for developing therefrom said B+ voltage.

8. A television display according to claim 7 wherein said B+ voltage developing means includes another winding located on the saturable reactor magnetizable core.

9. A television display according to claims 7 or 8 wherein the operating frequency of said source of alternating input voltage is equal to or greater than the horizontal deflection frequency.

10. A television display according to claim 9 wherein said source of alternating input voltage comprises a square-wave inverter responsive to an unregulated DC voltage for developing therefrom said alternating input voltage.

* * * * *